US007636408B2

United States Patent
Bau et al.

(10) Patent No.: US 7,636,408 B2
(45) Date of Patent: Dec. 22, 2009

(54) RELIABLE STARTUP AND STEADY-STATE OF ESTIMATION BASED CDR AND DFE

(75) Inventors: Jason H. Bau, Mountain View, CA (US); Drew G. Doblar, San Jose, CA (US); Gabriel C. Risk, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 653 days.

(21) Appl. No.: 11/445,781

(22) Filed: Jun. 1, 2006

(65) Prior Publication Data

US 2007/0280343 A1    Dec. 6, 2007

(51) Int. Cl.
*H04L 7/00* (2006.01)

(52) U.S. Cl. .................. 375/354; 375/231; 375/233; 375/344; 375/350

(58) Field of Classification Search .............. 375/229, 375/230–233, 340, 344, 350, 354, 371, 375; 455/182.2, 192.2; 370/503
See application file for complete search history.

(56) References Cited

U.S. PATENT DOCUMENTS

| 6,002,717 | A  | * | 12/1999 | Gaudet ................... 375/232 |
| 6,516,422 | B1 |   | 2/2003  | Doblar et al. |
| 6,614,842 | B1 | * | 9/2003  | Chou et al. ............... 375/232 |
| 6,614,862 | B1 |   | 9/2003  | Doblar |
| 6,937,680 | B2 |   | 8/2005  | Fong et al. |
| 7,190,742 | B2 | * | 3/2007  | Popescu et al. ............ 375/326 |
| 7,483,478 | B2 | * | 1/2009  | Kikugawa et al. .......... 375/229 |
| 2004/0012577 | A1 | | 1/2004 | Naegle |

OTHER PUBLICATIONS

"Designing Bang-Bang PLLs for Clock and Data Recovery in Serial Data Transmission Systems"; Richard C. Walker, Agilent Laboratories, Palo Alto, CA; pp. 1-12, IEEE Press, Feb. 2003.

(Continued)

*Primary Examiner*—Dac V Ha
(74) *Attorney, Agent, or Firm*—Rory D. Rankin; Meyertons Hood Kivlin Kowert & Goetzel, P.C.

(57) ABSTRACT

An apparatus and methods for recovering a clock and a data stream from a source synchronous input data stream are disclosed. The apparatus comprises a filter, a decision feedback equalizer (DFE), a phase error detector, and a clock generator. The input data stream is coupled to the filter and the DFE. The DFE synchronizes the input data stream to a clock generated by the clock generator. A filter output and a DFE output are each coupled to the phase error detector. During an initialization period, the phase error detector conveys a phase error to the clock generator based on one or more phase error estimates of the filter output and during a period of steady-state operation, the phase error detector conveys a phase error to the clock generator based on one or more phase error estimates of the DFE output. The output of the DFE comprises a recovered data stream.

20 Claims, 7 Drawing Sheets

OTHER PUBLICATIONS

"A Second-Order Semi-Digital Clock Recovery Circuit Based on Injection Locking"; M.-J. Edward Lee, William J. Daily, John Poulton, Trey Greer, John Edmondson, Ramin Farjad-Rad, Hiok-Tiaq Ng, Rohit Rathi, and Ramesh Senthinathan; Vilio Communications, Milpitas, CA & Stanford University, Stanford, CA; ISSCC 2003/Session 4/Clock Recovery and Backplane Transceivers/Paper 4.3; © 2003 IEEE International Solid-State Circuits Conference.

"Computationally Efficient Version of the Decision Feedback Equalizer"; Gupta, R., Kiran, Lee, Edward A., University of California, Berkley; Acoustics, Speech, and Signal Processing, 1999. ICASSP apos;99. Proceedings., 1999 IEEE International Conference; vol. 3, Issue, 15-19 Mar. 1999 pp. 1257-1260.

"Decision-Feedback Equalization of Pulse-Position Modulation on Measured Nondirected Indoor Infrared Channels"; Audeh, Malik D., Kahn, Joseph M., and Barry, John R.; IEEE Transactions on Communications, vol. 47, No. 4, Apr. 1999; pp. 500-503.

"Timing Recovery in Digital Subscriber Loops"; Agazzi, Oscar, Tzeng, Chin-Pyng Jeremy, Messerschmitt, David G., and Hodges, David A.; IEEE Transactions on Communications, vol. Com-33, No. 6, Jun. 1985, pp. 558-569.

"Matched Filtering and Timing Recovery in Digital Receivers"; Litwin, Louis; RF Time and Frequency; www.adesign.com; Sep. 2001; pp. 32-48.

* cited by examiner

RELIABLE STARTUP AND STEADY-STATE OF ESTIMATION BASED CDR AND DFE

BACKGROUND OF THE INVENTION

1. Field of the Invention

This invention relates to clock and data recovery circuits and, more particularly, to techniques for clock and data recovery.

2. Description of the Related Art

High-speed data communication systems frequently rely on clock and data recovery (CDR) circuits within the receiver instead of transmitting a reference clock with the data. The CDR extracts a clock that is embedded in the incoming data stream. Once a clock is recovered, it is used to sample the incoming data stream to recover the individual bits. A variety of clock recovery circuits are well known, including phase-locked loops (both analog and digital) and delay lock loops. Regardless of the circuit used, a clock recovery circuit attempts to extract the frequency and phase of the clock from a data stream.

During propagation, data signals may experience distortion due to bandwidth limitations, dispersion, etc. in the communication channel. These effects cause a spreading of signal pulse energy from one symbol period to another. The resulting distortion is known as inter-symbol interference (ISI). Generally speaking, ISI becomes worse as the speed of communication increases. As a result, high-speed communication systems often incorporate circuitry to equalize the effects of ISI. One technique for reducing the effect of ISI is to use an adaptive equalizer such as a decision feedback equalizer (DFE).

DFE's produce an equalized data stream as follows. A clock recovered from the data is used to sample the data at regular intervals. The output of the sampler, which constitutes the retimed data, is stored in a series of latches. The input of the sampler includes the original data plus the individually weighted outputs from each latch. The weights are determined adaptively by analyzing the resulting data stream. Over time, the DFE is expected to produce a stable set of weights that equalize ISI. In order to function properly, the DFE requires a stable recovered clock.

To recover a stable clock, one type of CDR uses an algorithm known as the Muller-Mueller algorithm. One aspect of the Muller-Mueller algorithm is that it uses only one sample per symbol of the received data to determine the timing error between the extracted clock and transitions of the received data. Performance of the Muller-Mueller algorithm is improved if the received signal is equalized before being sampled. However, as previously noted, a DFE requires a stable clock in order to perform equalization. Hence, these DFE-based CDR systems include two interdependent adaptation loops. This interdependence can cause difficulty in startup situations both the CDR and DFE are initializing. Convergence of clock timing and DFE adaptation may take an excessively long time, or may never occur. Previous attempts to improve convergence involve complex systems to limit the range of DFE weights or to predict the proper weights via sophisticated modeling of the expected ISI. Alternatively, a clock training pattern is sometimes transmitted while the DFE coefficients are held fixed, allowing the CDR to adapt first. Once the CDR is stable, the DFE coefficients are permitted to vary, in the hope that stable coefficients will be found within a reasonable time. Unfortunately, these methods are often insufficient to reduce convergence times to acceptable levels. What is needed are systems and methods of rapidly and efficiently initializing adaptive, interdependent DFE and CDR loops.

SUMMARY OF THE INVENTION

Various embodiments of an apparatus and methods for recovering a clock and a data stream from an input data stream are disclosed. In one embodiment, an apparatus comprises a filter, a decision feedback equalizer (DFE), a phase error detector, and a clock generator. The input data stream is coupled to the filter and the DFE. The DFE is configured to synchronize the input data stream to a clock generated by the clock generator. An output of the filter and an output of the DFE are each coupled to the phase error detector. The phase error detector is configured to convey a phase error to the clock generator based on one or more phase error estimates of the output of the filter and/or the output of the DFE. The output of the DFE comprises a recovered data stream.

In a further embodiment, during an initialization period, the phase error detector is configured to convey a phase error to the clock generator based on one or more phase error estimates of the output of the filter, and during a period of steady-state operation, the phase error detector is configured to convey a phase error to the clock generator based on one or more phase error estimates of the output of the DFE. In a still further embodiment, during a period of time between the initialization period and the period of steady-state operation, the phase error detector is configured to gradually change the basis of the phase error from one or more phase error estimates of the output of the filter to one or more phase error estimates of the output of the DFE.

Figure 1:
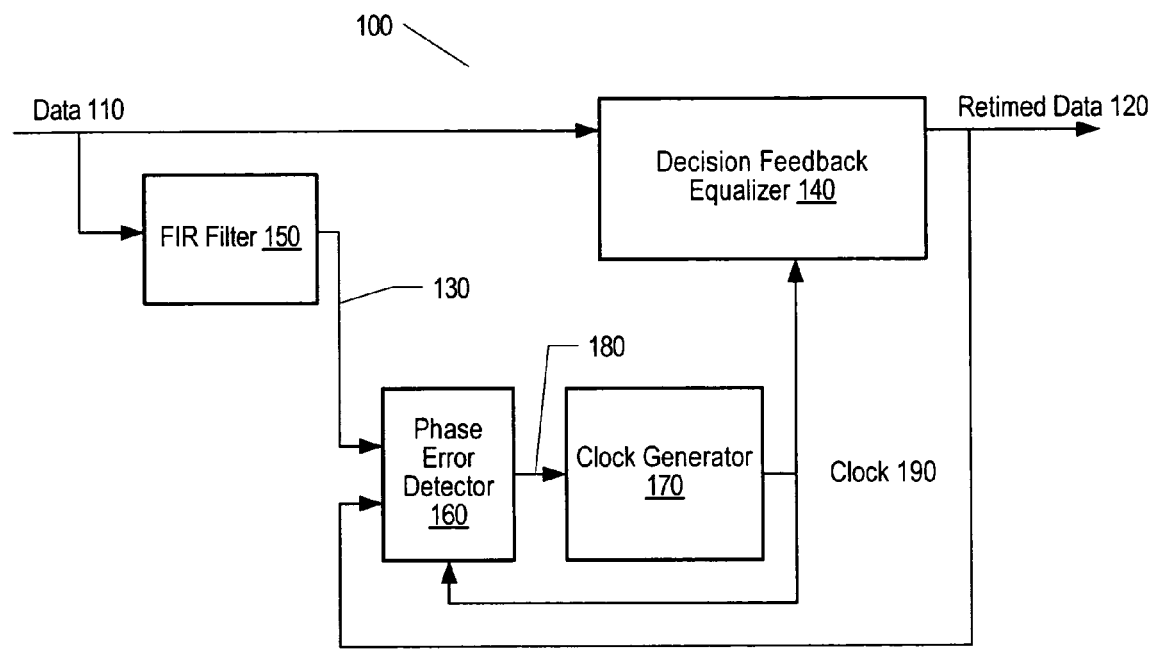
FIG. 1 is a generalized block diagram of one-embodiment of a CDR that includes a DFE.

While the invention is susceptible to various modifications and alternative forms, specific embodiments are shown by way of example in the drawings and are herein described in detail. It should be understood, however, that drawings and detailed descriptions thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 is a generalized block diagram of one embodiment of a CDR 100 that includes a DFE 140. In addition to DFE 140, CDR 100 may include a finite impulse response filter (FIR) 150, a phase error detector 160, and a clock generator 170. In the illustrated embodiment, CDR 100 receives data 110 and produces retimed data 120. Data 110 is input to both DFE 140 and filter 150. The output of DFE 140 (retimed data 120) and the output of filter 150 (filtered data 130) are coupled to phase error detector 160. The output 180 of phase error detector 160 is coupled to clock generator 170, which may generate a clock 190 that is supplied to DFE 140 and fed back to phase error detector 160.

During operation, output 180 of phase error detector 160 indicates whether the phase of clock 190 should be advanced or delayed. In one embodiment, phase error detector 160 may compare the phase of clock 190 to the phase of either filtered data 130 or retimed data 120, accumulating a number of phase error samples and using a voting algorithm to determine the value of output 180. During CDR 100 initialization, phase error detector 160 may be configured to perform phase comparisons exclusively between clock 190 and filtered data 130. In one embodiment, filter 150 does not require an adaptation period in order to provide stable, filtered data. Consequently, since filtered data 130 is stable during initialization, phase error detector 160 and clock generator 170 are able to stablize clock 190 during initialization. Also during initialization, DFE 140 may take advantage of a stable clock 190 to adapt its equalization parameters to data 110. Once DFE 140 has stabilized, during steady-state operation of CDR 100, phase error detector 160 may be configured to perform phase comparisons exclusively between the clock and retimed data 120. In one embodiment, as will be described below, phase error detector 160 may be configured to gradually switch from comparisons between clock 190 and filtered data 130 to comparisons between clock 190 and retimed data 120.

Figure 2:
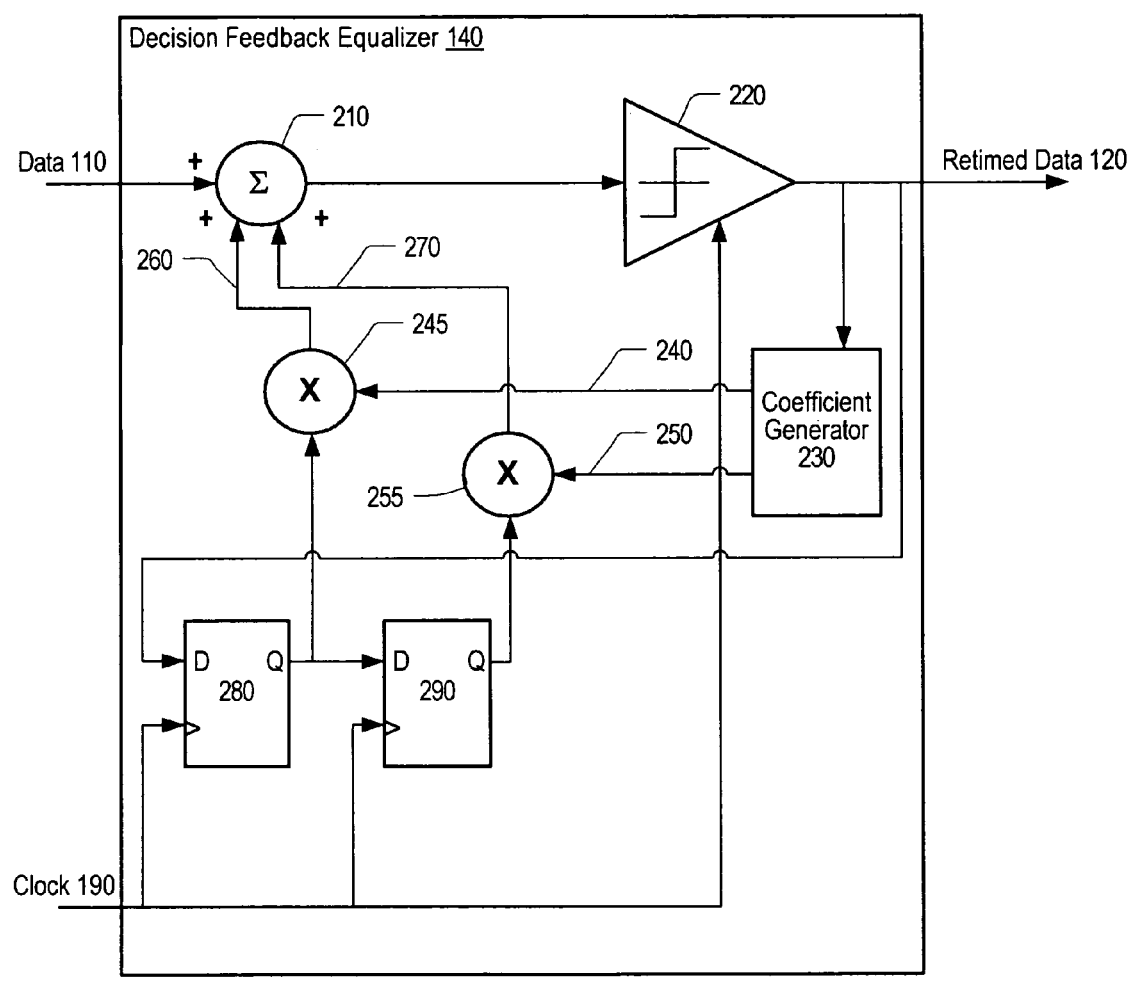
FIG. 2 is a block diagram of one embodiment of a DFE.

FIG. 2 is a block diagram of one embodiment of DFE 140. As shown, DFE 140 includes an adder 210, a slicer 220, a coefficient generator 230, multipliers 245 and 255, and latches 280 and 290. DFE 140 receives data 110 and clock 190 and outputs retimed data 120. More specifically, during operation, slicer 220 samples the output of adder 210 in synchronization with clock 190. The output of slicer 220 is fed back to a series of latches, 280 and 290, which store samples of retimed data 120 at time intervals of one cycle of clock 190. The outputs of latches 280 and 290 are coupled to multipliers 245 and 255 respectively, where they are multiplied by coefficients 240 and 250 respectively. The outputs of multipliers 245 and 255 are added to data 110 by adder 210. In various embodiments, coefficients 240 and 250 may be generated by coefficient generator 230 through any of a number of well-known adaptation processes. For example, in one embodiment, coefficient generator 230 may include a microcontroller executing adaptive software or firmware to calculate coefficients based on an evaluation of the shape of data pulses within retimed data 120.

In the embodiment illustrated in FIG. 2, two latches (280 and 290) are shown by way of example only. In alternative embodiments, fewer than two or more than two latches may be included in DFE 140. Each latch may be associated with a respective multiplier and coefficient. Further alternative embodiments of DFE 140 will be apparent to those skilled in the art.

Figure 3:
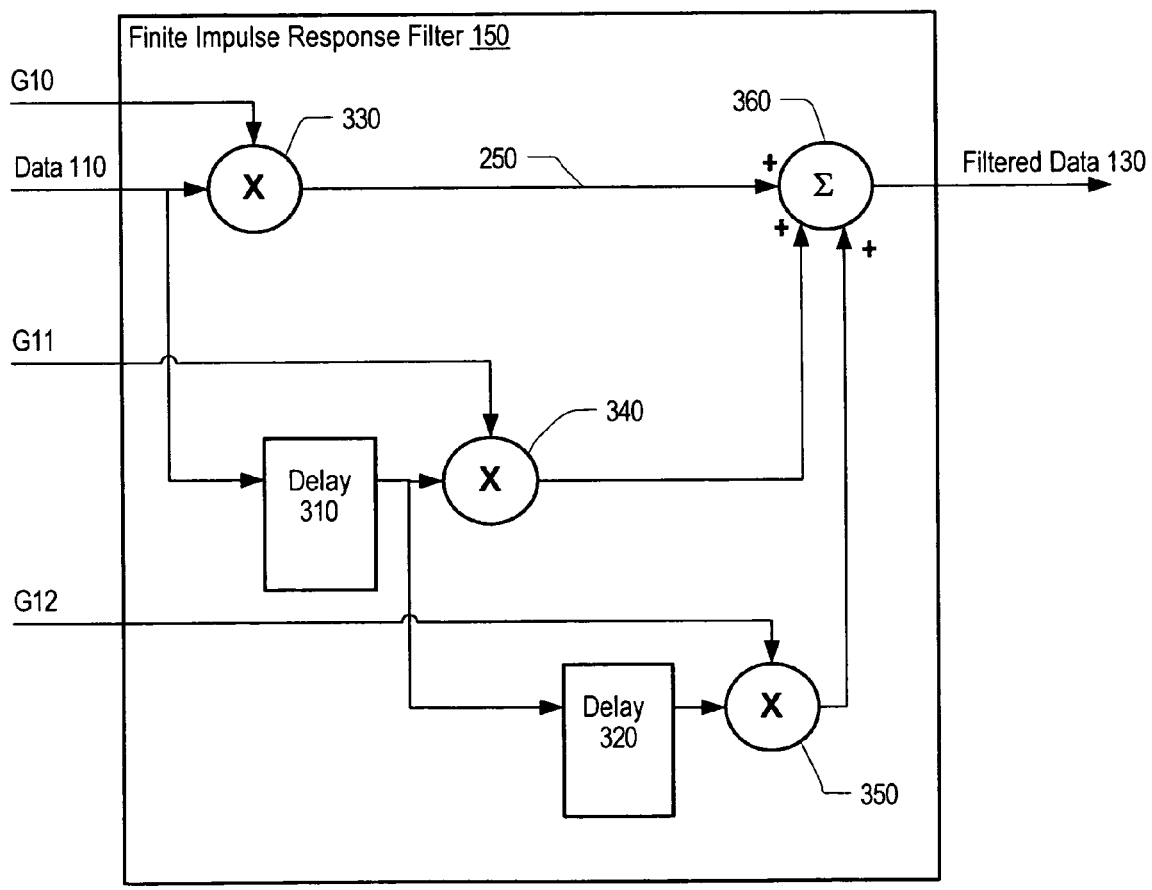
FIG. 3 is a block diagram of one embodiment of a filter.

FIG. 3 is a block diagram of one embodiment of filter 150. As shown, filter 150 includes delays 310 and 320, multipliers 330, 340, and 350, and an adder 360. Filter 150 receives data 110 and coefficients G10-G12 and outputs filtered data 120. In operation, data 110 is multiplied by coefficient G10 in multiplier 330. In addition, data 110 is delayed by a fixed time interval by delay 310 and multiplied by coefficient G11 in multiplier 340. The output of delay 310 is delayed further by a fixed time interval by delay 320 and multiplied by coefficient G12 in multiplier 350. The outputs of multipliers 330, 340, and 350 are accumulated by adder 360 to produce filtered data 130.

In the embodiment illustrated in FIG. 3, two delays (310 and 320) are shown by way of example only. In alternative embodiments, fewer than two or more than two delays may be included in filter 150. Each delay may be associated with a respective multiplier and coefficient. In further alternative embodiments, filter 150 may be any of a variety of digital filters that do not require a significant adaptation period to produce a filtered output.

Figure 4:
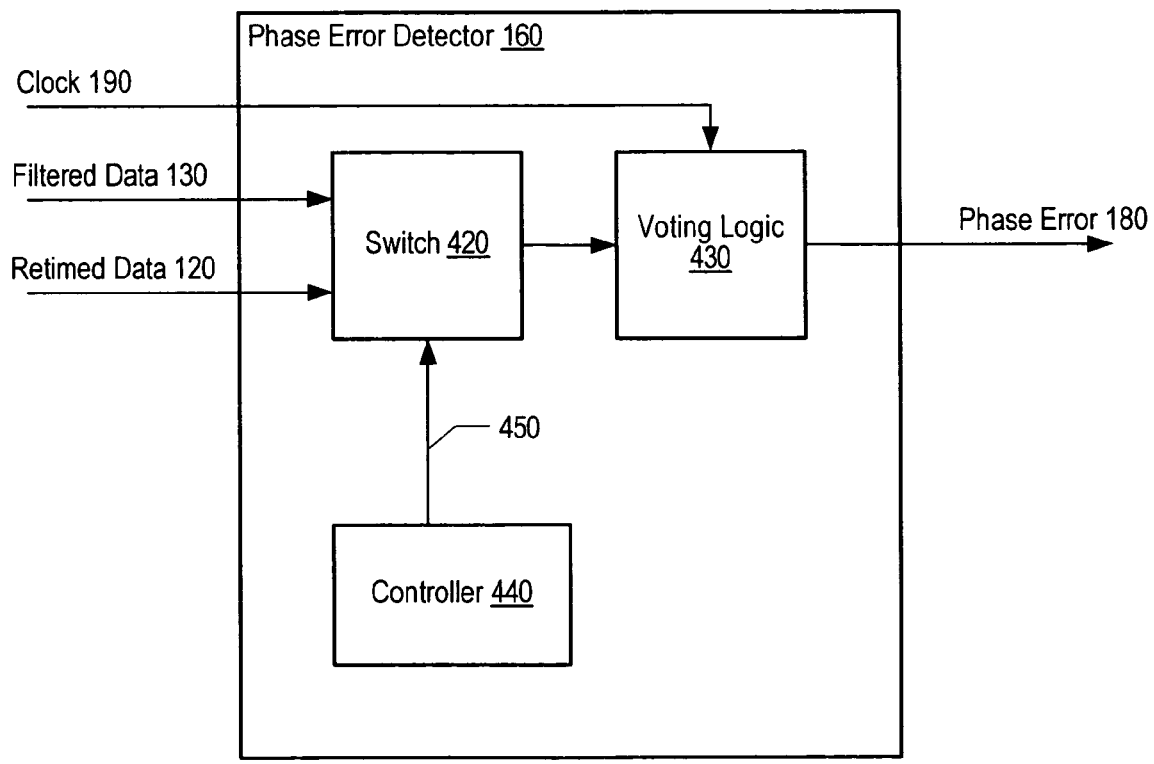
FIG. 4 is a block diagram of one embodiment of a phase error detector.

FIG. 4 is a block diagram of one embodiment of phase error detector 160. As shown, phase error detector 160 includes a switch 420 coupled to voting logic 430, and a controller 440. In operation, switch 420 may be configured by controller 440 to select between retimed data 120 and filtered data 130, conveying the result to voting logic 430. In one embodiment, controller 440 may be a microcontroller executing software or firmware to determine the desired state of switch 420 based on a pre-determined initialization sequence or on a variety of inputs such as a measurement of the signal to noise ratio of retimed data 120 or a user input.

Voting logic 430 is coupled to the output of switch 420 and to clock 190. The output of switch 420 provides a data stream to voting logic 430. By comparing the phase of the received data to the phase of clock 190, voting logic 430 may generate a phase error 180. In one embodiment, voting logic 430 may take a number of samples of the data stream and compare the phase of each sample to the phase of clock 190, with each sample producing an indication that the phase is either early or late. Once a desired number of comparisons has been accumulated, voting logic 430 may tally the resulting early or late indications to produce phase error 180. For example, in one embodiment, output 180 may depend on the majority vote of sixteen comparisons between successive samples of clock 190 and the data stream. Accordingly, phase error 180 may be a series of signals, each of which indicates to clock generator 170 to either advance or delay the phase of clock 190. Of course, voting logic 430 may tally the votes of more than sixteen or fewer than sixteen comparisons for each signal within phase error 180, depending on the complexity of voting logic 430 and desired functionality.

In one embodiment, at the start of the initialization of CDR 100, controller 440 may configure switch 420 to provide an output data stream consisting exclusively of filtered data 130. Subsequently, after initialization is complete, controller 440 may configure switch 420 to provide an output data stream consisting exclusively of retimed data 120. Controller 440 may change the configuration of switch 420 according to any of a variety of patterns. For example, in one embodiment, controller 440 may wait for a predetermined time period and then cause switch 420 to select retimed data 120. In an alternative embodiment, controller 440 may cause switch 420 to gradually add samples of retimed data 120 to the output data stream while reducing the proportion of data samples from filtered data 130 during a transition period following initialization. In a further alternative, controller 440 may monitor the variance of comparisons between clock 190 and the data stream. When the variance falls below a predetermined threshold, controller 440 may cause switch 420 to switch its output to a data stream consisting exclusively of retimed data 120.

Figure 5:
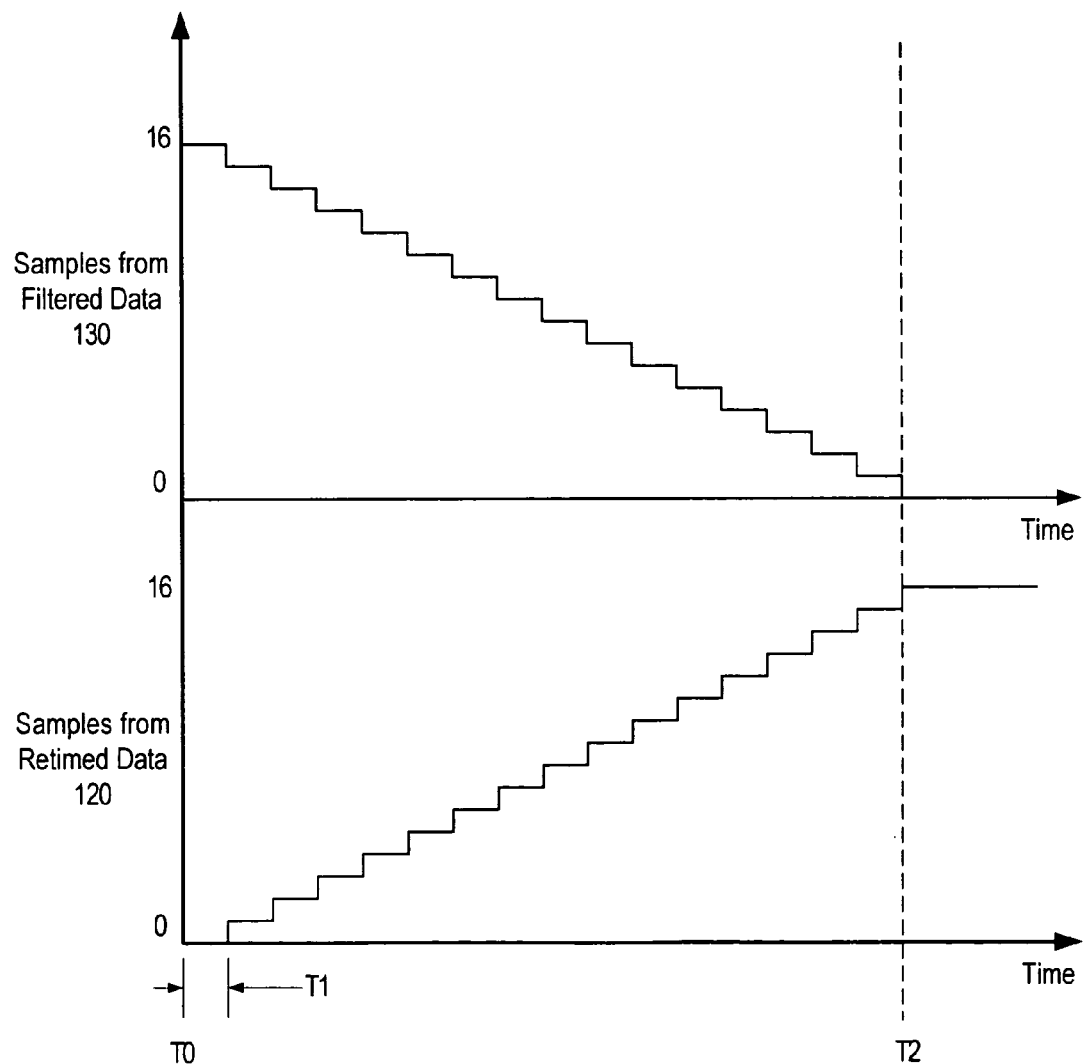
FIG. 5 illustrates one embodiment of a pattern of data samples selected by a switch within a phase error detector during a transition period.

FIG. 5 illustrates one embodiment of a pattern of data samples selected by switch 420 during a transition period. The top of FIG. 5 represents the number of samples taken from filtered data 130 as a function of time. The bottom of FIG. 5 represents the number of samples taken from retimed data 120 as a function of time. On the time axis, T0 represents the start of the transition period. T1 represents a predetermined time interval longer than the time between successive tallies by voting logic 430. T2 represents the end of the transition period. In the illustrated embodiment, voting logic 430 is configured to accumulate 16 comparisons for each output to phase error 180. Beginning at time T0, switch 420 takes sixteen samples from filtered data 130. After one interval of T1, switch 420 takes fifteen samples from filtered data 130 and one sample from retimed data 120. After a second interval of T1, switch 420 takes fourteen samples from filtered data 130 and two samples from retimed data 120, etc. At time T2, switch 420 has reduced the number of samples taken from filtered data 130 to zero and increased the number of samples taken from retimed data 120 to sixteen.

Figure 6:
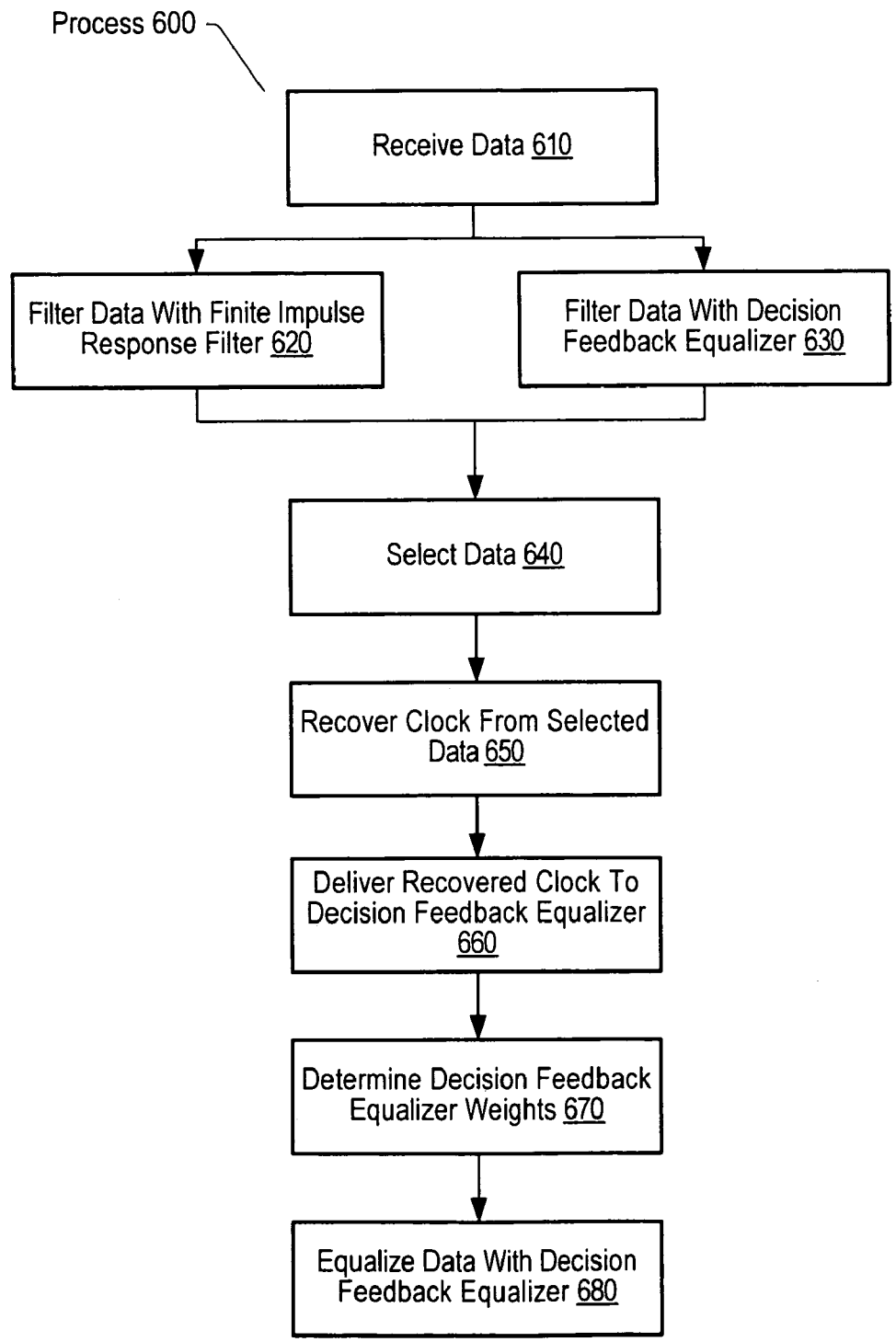
FIG. 6 illustrates one embodiment of a process that may be used to recover a clock and data from a source-synchronous signal.

FIG. 6 illustrates one embodiment of a process 600 that may be used to recover a clock and data from a source-synchronous signal. Process 600 may begin with data being received (block 610). The received data may be filtered by an FIR (block 620) and by a DFE (block 630) in parallel. Filtered data from either the DFE or the FIR may be selected (block 640) and used to recover a clock (block 650). A recovered clock may be delivered to a DFE (block 660). The DFE may use the recovered clock in adapting a set of weights (block 670) with which to equalize the incoming data (block 680).

Figure 7:
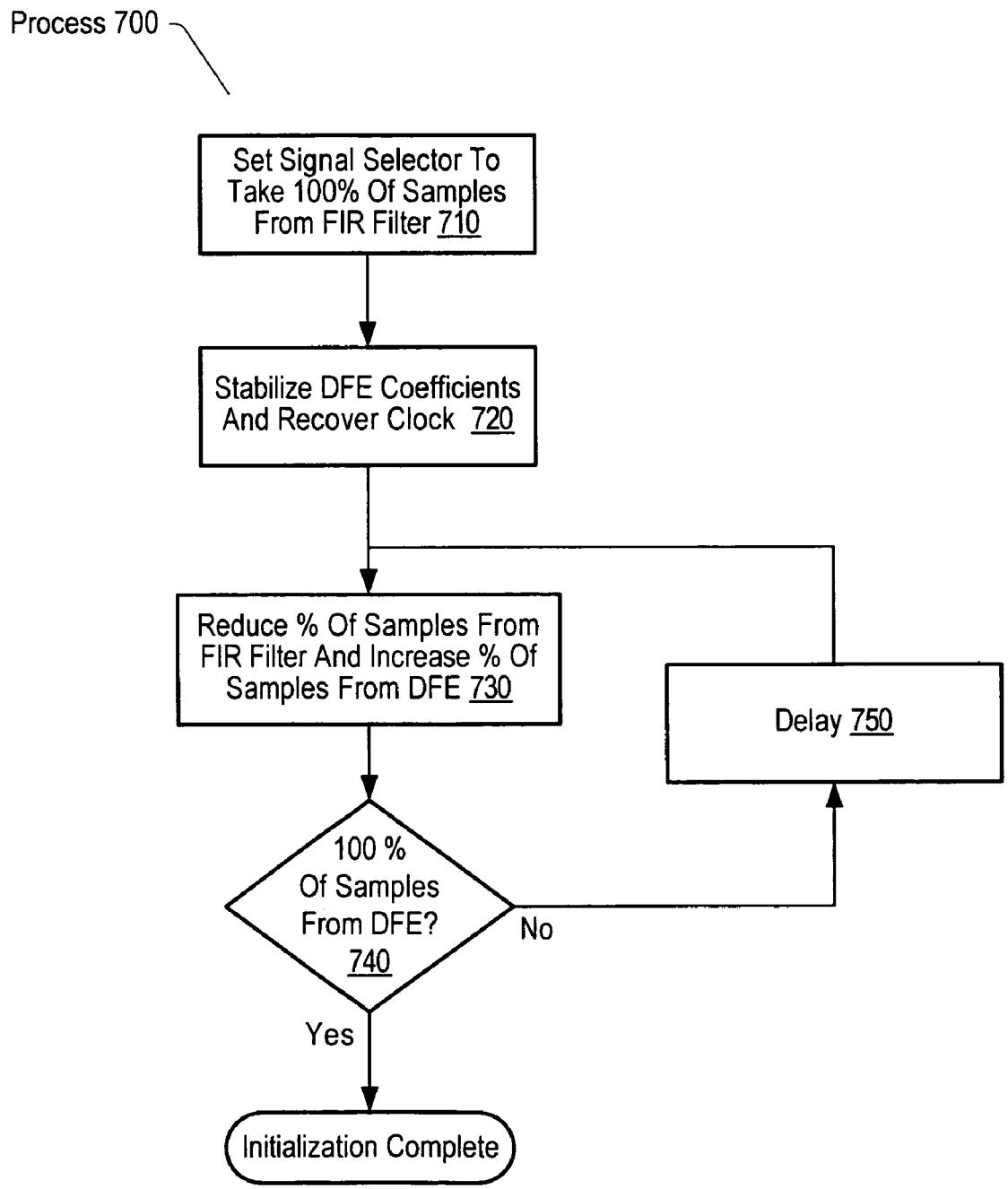
FIG. 7 illustrates one embodiment of a process that may be used to initialize a clock and data recovery circuit.

FIG. 7 illustrates one embodiment of a process 700 that may be used to initialize a clock and data recovery circuit. Initialization may begin with setting a signal selector to select only data from a finite impulse response filter (FIR) to drive the clock recovery circuit (block 710). While the signal selector is so configured, a clock may be recovered and the coefficients of a distributed feedback equalizer (DFE) may be stabilized (block 720). Once the clock has been recovered and the DFE coefficients are stable, the signal selector may incrementally increase the proportion of the data that is sent to the clock recovery circuit from the DFE and decrease the proportion of the data that is sent to the clock recovery circuit from the FIR (block 730). Next, a check may be made to determine if only data from the DFE is selected to drive the clock recovery circuit (decision block 740). If the signal selector is not selecting only data from the DFE to drive the clock recovery circuit, a delay of a predetermined interval may be executed (block 750). After the delay, the signal selector may again incrementally increase the proportion of the data that is sent to the clock recovery circuit from the DFE and decrease the proportion of the data that is sent to the clock recovery circuit from the FIR (block 730). Once the signal selector is selecting only data from the DFE to drive the clock recovery circuit, then the initialization is complete.

It is noted that the above-described embodiments may comprise software. For example, the functionality of coefficient generator 230 and controller 440 may be implemented in hardware, software, firmware, or some combination of the above. In such embodiments, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus configured to recover a clock and data from an input data stream, the apparatus comprising:
   a filter;
   a decision feedback equalizer (DFE); and
   a phase error detector;
   wherein the input data stream is coupled to the filter and the decision feedback equalizer (DFE);
   wherein the DFE is configured to synchronize the input data stream to a clock;
   wherein an output of the filter and an output of the DFE are each coupled to the phase error detector; and
   wherein the phase error detector is configured to convey a phase error based on one or more phase error estimates of the output of the filter and/or the output of the DFE.

2. The apparatus of claim 1, wherein the output of the DFE comprises a recovered data stream.

3. The apparatus of claim 1, wherein the filter is a finite impulse response filter.

4. The apparatus of claim 1, wherein the DFE uses an adaptive algorithm to determined the values of a set of feedback coefficients.

5. The apparatus of claim 1, wherein the phase error detector uses a voting algorithm to determine the phase error.

6. The apparatus of claim 1, wherein during an initialization period, the phase error detector is configured to convey a phase error to the clock generator based on one or more phase error estimates of the output of the filter, and during a period of steady-state operation, the phase error detector is configured to convey a phase error to the clock generator based on one or more phase error estimates of the output of the DFE.

7. The apparatus of claim 6, wherein the DFE uses an adaptive algorithm to determined the values of a set of feedback coefficients during the initialization period.

8. The apparatus of claim 6, wherein during a period of time between the initialization period and the period of steady-state operation, the phase error detector is configured to gradually change the basis of the phase error from one or more phase error estimates of the output of the filter to one or more phase error estimates of the output of the DFE.

9. The apparatus of claim 6, wherein the phase error detector is configured to determine the end of the initialization period by measuring a variance of the phase error.

10. The apparatus of claim 6, wherein the initialization period has a fixed duration.

11. The apparatus of claim 1, wherein the apparatus is integrated into a serializer/deserializer.

12. A method of recovering a clock and data from an input data stream, the method comprising:
   receiving an input data stream at a filter and a distributed feedback equalizer (DFE), wherein the DFE is configured to synchronize the input data stream to a clock;
   conveying an output of the filter and an output of the DFE to a phase error detector; and
   conveying a phase error from the phase error detector to a clock generator based on one or more phase error estimates of the output of the filter and/or the output of the DFE.

13. The method of claim 12, wherein the output of the DFE comprises a recovered data stream.

14. The method of claim 12, wherein the filter is a finite impulse response filter.

15. The method of claim 12, further comprising the DFE determining the values of a set of feedback coefficients via an adaptive algorithm.

16. The method of claim 12, further comprising the phase error detector determining the phase error via a voting algorithm.

17. The method of claim 12, further comprising the phase error detector:
- conveying a phase error to the clock generator based on one or more phase error estimates of the output of the filter during an initialization period; and
- conveying a phase error to the clock generator based on one or more phase error estimates of the output of the DFE during a period of steady-state operation.

18. The method of claim 17, further comprising the DFE determining the values of a set of feedback coefficients via an adaptive algorithm during the initialization period.

19. The method of claim 17, further comprising the phase error detector gradually changing the basis of the phase error from one or more phase error estimates of the output of the filter to one or more phase error estimates of the output of the DFE during a period of time between the initialization period and the period of steady-state operation.

20. A system configured to recover a clock and data from a data stream, the system comprising:
- a transmitter configured to convey a data stream; and
- a receiver, wherein the receiver is configured to:
  - receive the data stream at a filter and a distributed feedback equalizer (DFE), wherein the DFE is configured to synchronize the data stream to a clock;
  - convey an output of the filter and an output of the DFE to a phase error detector; and
  - convey a phase error from the phase error detector to a clock generator based on one or more phase error estimates of the output of the filter and/or the output of the DFE.

* * * * *

UNITED STATES PATENT AND TRADEMARK OFFICE
CERTIFICATE OF CORRECTION

PATENT NO. : 7,636,408 B2  Page 1 of 1
APPLICATION NO. : 11/445781
DATED : December 22, 2009
INVENTOR(S) : Bau et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 726 days.

Signed and Sealed this

Ninth Day of November, 2010

David J. Kappos
*Director of the United States Patent and Trademark Office*